United States Patent [19]

Miyano

[11] Patent Number: 5,099,729
[45] Date of Patent: Mar. 31, 1992

[54] SUBMERGED WORK MACHINE TOOL

[75] Inventor: Toshiharu Miyano, Barrington Hills, Ill.

[73] Assignee: Miyano Machinery USA Inc., Wood Dale, Ill.

[21] Appl. No.: 679,635

[22] Filed: Apr. 2, 1991

[51] Int. Cl.$^5$ .................. B23B 13/00; B23H 1/00; B23Q 11/12

[52] U.S. Cl. .................. 82/124; 82/900; 219/69.11; 29/DIG. 71; 51/235; 51/266; 51/356; 269/13

[58] Field of Search ........... 82/117, 1.11, 124, 900, 82/901, 173; 409/225, 135, 136; 279/3; 29/DIG. 71, DIG. 50, DIG. 53, DIG. 68, DIG. 77; 204/297 M; 219/69.11, 69.15, 69.17; 51/235, 266, 356; 269/13, 14, 21

[56] References Cited

U.S. PATENT DOCUMENTS

| | | | |
|---|---|---|---|
| 1,446,305 | 2/1923 | Howe | 82/124 |
| 1,524,527 | 1/1925 | Sears | 82/901 |
| 3,536,594 | 10/1970 | Pritchard | 204/297 M |
| 4,657,068 | 4/1987 | Peltz | 51/235 |
| 5,049,715 | 9/1991 | Tanaka | 219/69.11 |

FOREIGN PATENT DOCUMENTS

| | | | |
|---|---|---|---|
| 994800 | 2/1983 | U.S.S.R. | 409/26 |
| 1468714 | 3/1989 | U.S.S.R. | 82/117 |

Primary Examiner—Larry I. Schwartz
Assistant Examiner—Kevin J. Carroll
Attorney, Agent, or Firm—Ladas & Parry

[57] ABSTRACT

A machine tool has a hollow drive spindle with a work holder attached thereto for holding work submerged in a machine liquid, such as mineral oil, contained in a machining chamber. The work is machined in the submerged state as a cutting tool is fed against the work rotating with the drive spindle. The machining liquid is additonally utilized for hydrodynamically loading the work on the work holder by drawing the liquid from the machining chamber into the hollow in the drive spindle, and for unloading the completed product from the work holder by forcing the liquid back into the machining chamber through the hollow in the drive spindle. A removable chip recovery vessel is provided for the recovery of the metal chips and particles from the machining liquid by recirculating it through the vessel. The machine tool can take various other arrangements for the performance of a variety of cutting operations.

17 Claims, 2 Drawing Sheets

SUBMERGED WORK MACHINE TOOL

BACKGROUND OF THE INVENTION

This invention relates to machine tools, and more particularly to those of the kind in which work is machined while being submerged in a body of a machining liquid such as mineral oil or an aqueous solution thereof in the form of an emulsion. Still more particularly, the invention pertains to a streamlined machine tool system including facilities for hydrodynamically loading the work in position and unloading the finished product by utilizing the machining liquid.

Electric discharge machining or electrospark machining represents a conventional art of submerged work machining. It is a process by which materials that conduct electricity are removed from a metal by an electric spark. The discharge machining apparatus has required dedicated mechanical means for the loading and unloading of work as well as for the recovery of the chips or cuttings created by machining. Such mechanical loading and unloading means and chip recovery means have made the complete machining system inordinately bulky in size and expensive in the cost of installation. Indeed, in some instances, the total cost of such additional means has been just as high as that of the apparatus used solely for discharge machining.

Another consideration that should enter into the design of any streamlined machine tooling system is how to make the finished products clean of the chips and particles attached thereto. This is usually done by rinsing the products. The rinsing process comes after the machining process. However, the products need not necessarily be rinsed immediately after having been machined. For this reason the rinsing means have usually been installed separately from the machine tool at the cost of additional space requirement.

SUMMARY OF THE INVENTION

The present invention provides a novel machine tooling system in which work is machined while being submerged in a body of a machining liquid, and in which this liquid is additionally utilized for additional purposes including, but not limited to, the loading of the work and the unloading of the finished product.

Briefly, the present invention may be summarized as a machine tool for machining work with a cutting tool in a submerged state, comprising a liquid tight enclosure defining a machining chamber which is to be filled with a machining liquid and in which work is to be machined in a submerged state. The machine tool further comprises tool holding means for holding a desired cutting tool in the machining chamber, work holding means for holding work in the machining chamber, means for hydrodynamically loading work on the work holding means by utilizing the machining liquid contained in the machining chamber, means for creating relative cutting action between the cutting tool being held by the tool holding means and the work being held by the work holding means in the machining chamber, so that the work is machined into a desired product while being submerged in the machining liquid, and means for hydrodynamically unloading the completed product from the work holding means by utilizing the machining liquid contained in the machining chamber.

In a preferred embodiment, the work to be machined is held by a chuck or like work holder on one end of a drive spindle for joint rotation therewith. A desired cutting tool is fed against the revolving work for cutting the same into a desired shape. The drive spindle has a hollow extending axially therethrough and communicating with the machining chamber. For hydrodynamically loading the work on the work holder and unloading the finished product therefrom, a hydraulic circuit including a reversible pump is provided which permits the bidirectional flow of the machining liquid out of and back into the machining chamber through the hollow in the drive spindle. The machining liquid may be pumped from the machining chamber into the hollow in the drive spindle for loading the work on the work holder, back into the machining chamber through the hollow in the drive spindle for unloading the completed product from the work holder.

No complex mechanical means are therefore required for such loading and unloading operations; only, a simple chute may be provided for introducing the work into the machining chamber and positioning the same in the neighborhood of the work holder on the hollow drive spindle.

The noted reversible pump is additionally utilized for the recovery of metal chips and other solids from the machining liquid by taking advantage of the fact that the hollow in the drive spindle is discommunicated from the machining chamber when the work is held by the work holder. There is provided to this end a second hydraulic circuit including a chip recovery vessel in communication with the machining chamber and with the first recited hydraulic circuit. When the hollow in the drive spindle is closed by the work on the work holder, the pump operates to cause the flow of the machining liquid from the machining chamber into the chip recovery vessel and thence back into the machining chamber via the first hydraulic circuit. The metal chips and other solids are to settle on the bottom of the chip recovery vessel. It will therefore be appreciated that the machining of the work and the recovery of the metal chips take place concurrently.

As a further feature of the invention, means may be provided for controlling the temperature of the machining liquid to suit each specific cutting operation. It is also possible to control the temperature of the complete machine tool through the temperature control of the machining liquid.

A still further feature of the invention resides in means for rinsing the successive products. Such means include another liquid tight enclosure defining a rinsing chamber, and another hydraulic circuit including another pump for recirculating a rinsing liquid out of and back into the rinsing chamber. Advantageously, the rinsing chamber may be disposed immediately under the machining chamber for receiving therefrom the completed product on being unloaded from the work holder. A double hatch may be provided between the rinsing chamber and the machining chamber in order to prevent the intermingling of the rinsing liquid and the machining liquid.

The above and other features and advantages of this invention and the manner of realizing them will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
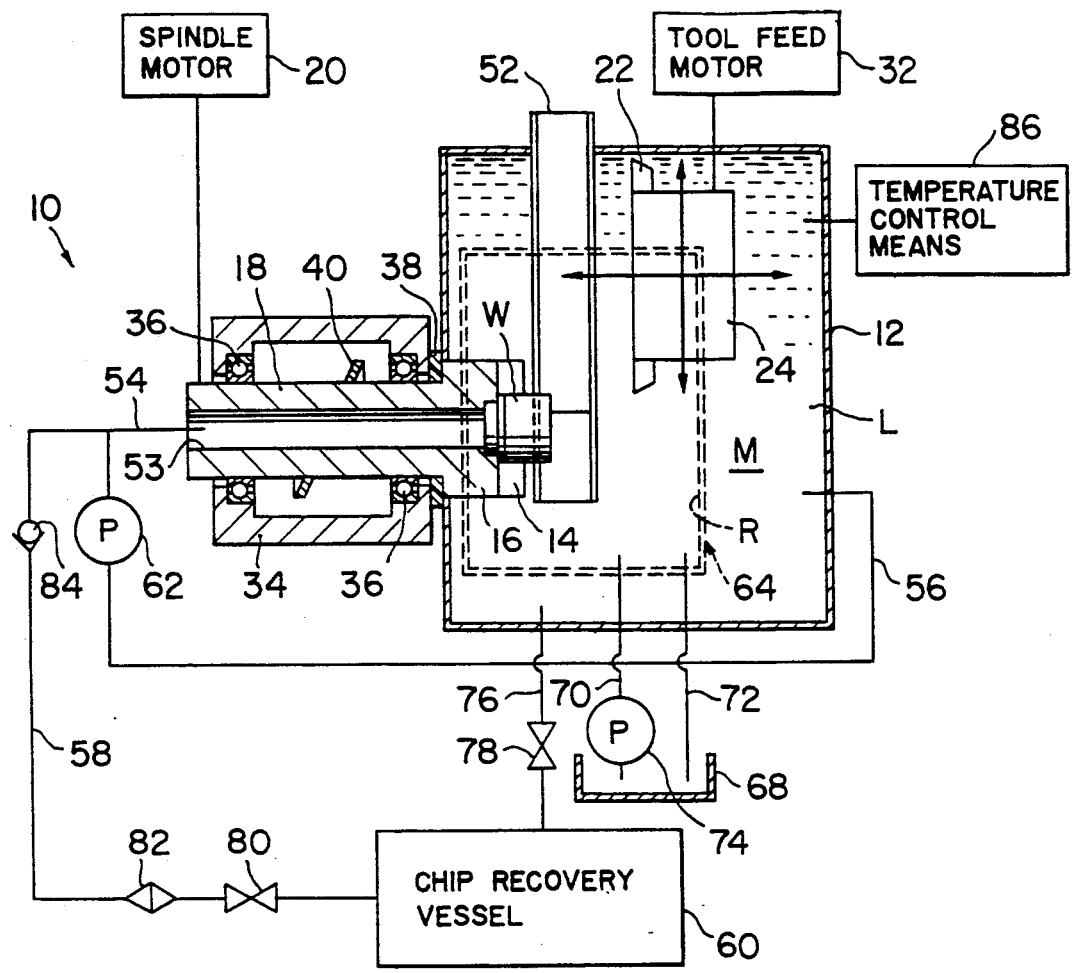
FIG. 1 is a diagrammatic representation, partly in section, of the machine tool constructed in accordance with the novel concepts of this invention.
Figure 2:
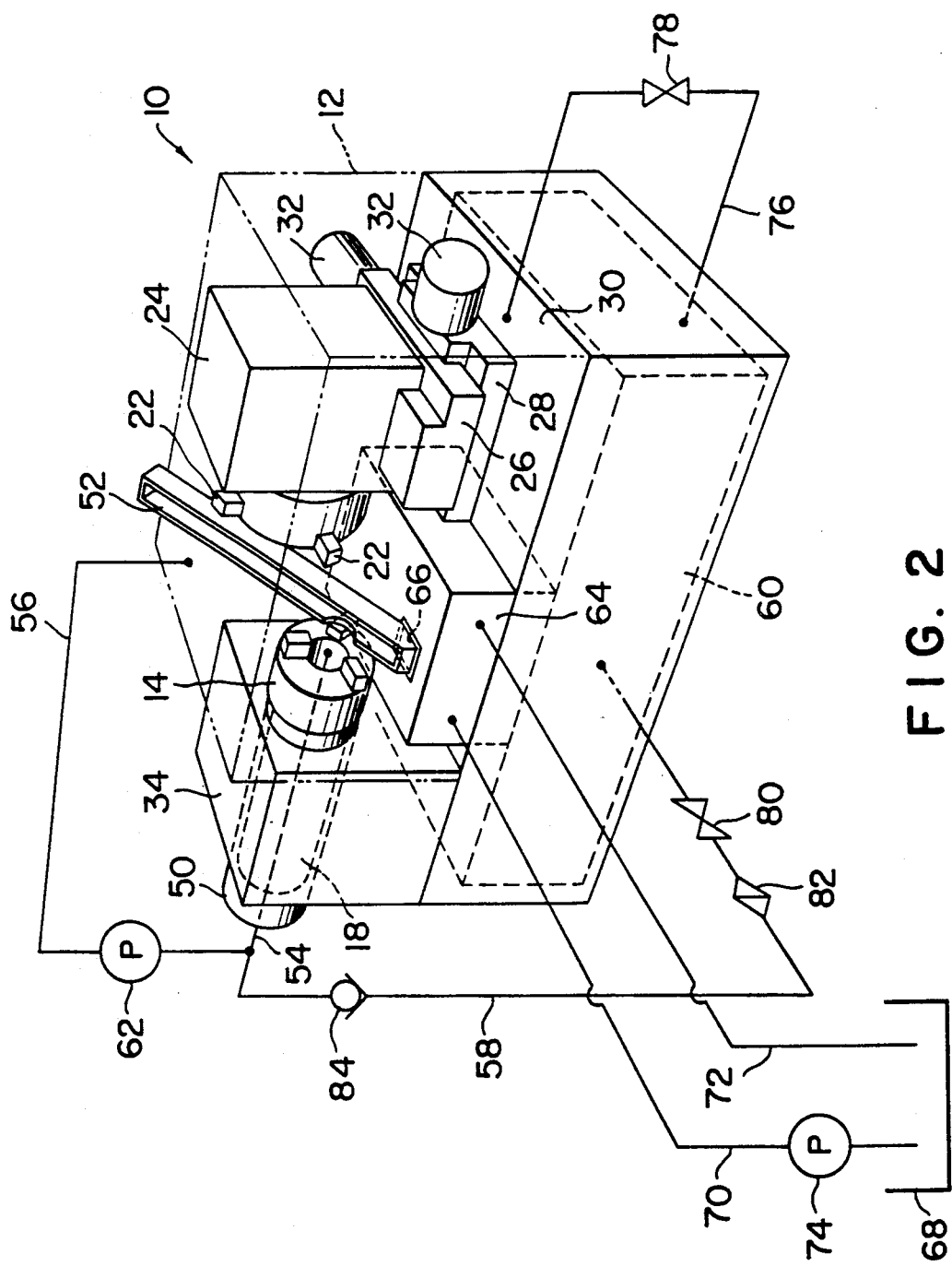
FIG. 2 is a diagrammatic perspective view of the machine tool of FIG. 1.

The submerged work machine tool illustrated in FIGS. 1 and 2 takes the form of a lathe by way of example, although it is readily adaptable for boring or milling as well. Generally designated 10, the illustrated machine tool has a liquid tight enclosure or vessel 12 which is shown filled with a suitable machining liquid L. The enclosure 12 defines a machining chamber M in which the work W is to be machined while being submerged in the body of the liquid L.

Holding the work W in the machining chamber M is a chuck 14, or any equivalent workholder, attached to the nose 16 of a hollow drive spindle 18. The chuck 14 as well as the spindle nose 16 is itself submerged in the liquid L for holding the work W submerged therein. A spindle motor 20 is drivingly coupled to the drive spindle 18 for imparting rotation thereto and hence to the work W held by the chuck 14 on the spindle nose 16.

Also submerged in the liquid L in the machining chamber M are a set of cutting tools 22 on a tool post 24. The cutting tools 22 are disposed opposite the chuck 14 for cutting the work W as the latter is revolved at high speed by the drive spindle 18. The tool post 24 is erected on a cross slide 26. This cross slide is slidably mounted on a saddle 28 which in turn is slidably mounted on a bed 30. Thus the tool post 24 with the cutting tools 22 thereon is movable both in a direction parallel to the axis of the drive spindle 18 and in a direction at right angles with the spindle axis. Servomotors 32 are provided for feeding the toolpost 24 in the two orthogonal directions.

FIG. 1 indicates that the drive spindle 18 is rotatably mounted within a headstock 34 by a pair of rolling element bearings 36. In this case, sealing means may be provided as at 38 in FIG. 1 in order to prevent the leakage of the liquid L from the machining chamber M. Additionally, as required or desired, an impeller 40 may be mounted on the drive spindle 18 for joint rotation therewith. The impeller 40 on rotation at high speed is intended to draw atmospheric air into the headstock 34. The air may be released from within the headstock 34 after having been compressed thereon. So forced into and out of the headstock 34, the air will serve the dual purpose of preventing liquid leakage from the machining chamber M and cooling the drive spindle 18 and other neighboring parts.

Figure 3:
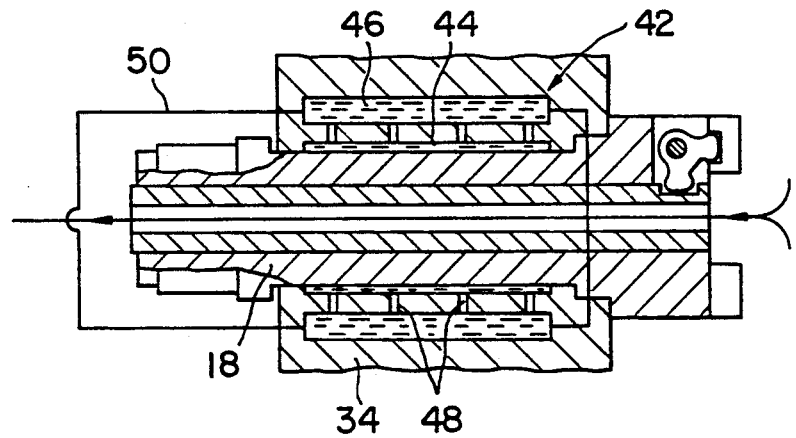
FIG. 3 is an axial sectional view showing alternative means for rotatably supporting the hollow drive spindle in the machine tool of FIGS. 1 and 2.

Alternatively, a hydrostatic bearing may be employed as indicated at 42 in FIG. 3 for rotatably supporting the drive spindle 18 with respect to the headstock 34. The hydrostatic bearing 42 is shown to have to nested tubular liquid chambers 44 and 46 intercommunicated via radial liquid passageways 48. The inner liquid chamber 44 is formed between drive spindle 18 and headstock 34. The outer liquid chamber 46, concentrically surrounding the inner liquid chamber 44, is defined in the headstock 34. The liquid may be circuited through a hydraulic circuit 50 including the outer liquid chamber 46. Pressurized on being directed into the inner liquid chamber 44, the liquid will hydrostatically support the drive spindle 18 on the headstock 34.

The submerged work machine tool 10 is further constructed for hydrodynamically introducing successive pieces of work W into the machining chamber M, loading them on the chuck 14 on the drive spindle 18, unloading the successive finished products from the chuck, and withdrawing them from the machining chamber. Employed toward this end is a slanting work chute 52 having one end disposed outside the enclosure 12. The work chute 52 extends into the machining chamber M and has its other end held adjacent the chuck 14 on the drive spindle 18.

As has been herein mentioned, the drive spindle 18 has a hollow 53 extending therethrough. In the absence of the work W on the chuck 14, this spindle hollow 53 is open to the machining chamber M on the one hand. On the other hand, the spindle hollow 53 communicates with a conduit 54. This conduit branches into a conduit 56 leading back to the enclosure 12 and another conduit 58 leading to a chip recovery vessel 60. Thus the machining chamber M, the hollow drive spindle 18, and the conduits 54 and 56 form a closed hydraulic circuit for the circulation of the machining liquid L. This hydraulic circuit functions primarily for loading the work W on the chuck 14 on the drive spindle 18 and, after the work has been machined, for unloading the completed product from the chuck.

As the name implies, the chip recovery vessel 60 is intended for the recovery of the metal chips, particles and other solids created by the cutting of the work W by the tools 22, from the machining chamber M. More will be said presently on how the chips are recovered.

A reversible hydraulic pump 62 is provided on the conduit 56. When driven forwardly, the pump 62 will draw the liquid L from the machining chamber M into the hollow 53 in the drive spindle 18. Then the liquid will flow back into the machining chamber M by way of the conduit 56. Driven reversely, on the other hand, the pump 62 will cause the liquid L to flow from the machining chamber M into the conduit 56 and back into the machining chamber through the hollow 53 in the drive spindle 18.

Thus, for loading, the work W may be introduced into the exposed entrance end of the work chute 52, with the pump 62 driven forwardly. Guided by the work chute 52, the work W will fall through the liquid L to the immediate proximity of the chuck 14 on the drive spindle 18. Since now the liquid L is being drawn from the machining chamber M into the hollow 53 in the drive spindle 18 through the chuck 14, the work W will be forced by such liquid flow into the chuck. The chuck 14 may then be closed for tightly gripping the work W in position thereon. The pump 62 may be set out of operation upon completion of work gripping by the chuck 14.

Then the drive spindle 18 may be set into rotation by the spindle motor 20. The cutting tool 22 on the toolpost 24 may be fed against the revolving work W for machining the same into a desired product.

Upon completion of the machining, the chuck 14 may be opened, and the pump 62 may be driven reversely. Then the liquid L will flow from the machining chamber M into the conduit 56 and thence into the hollow 53 in the drive spindle 18. This reverse liquid stream under pressure will force the completed product out of the open chuck 14, returning it into the work chute 52.

The slanting work chute 52 has its exit end held against a removable enclosure 64 defining a rinsing chamber R under the machining chamber M. The rinsing chamber R is to be filled with a rinsing liquid. Normally, a hatch 66 discommunicates the rinsing chamber R from the machining chamber M. Although not clearly seen in the drawings, the hatch 66 is of dual construction in order to prevent the intermingling of the rinsing liquid with the machining liquid L in the machining chamber M. The hatch 66 may be opened each time the finished product, unloaded from the chuck 14, is positioned on the exit end of the work chute 52. Then the product will fall into the rinsing chamber R, therein to be cleaned with the rinsing liquid.

The above loading, machining and rinsing cycle may be repeated until any desired number of products are received in the rinsing chamber R. Then the rinsing chamber enclosure 64 may be withdrawn from the machine tool 10 together with the rinsed products contained therein.

At 68 in FIGS. 1 and 2 is shown a reservoir containing the rinsing liquid to be supplied to the rinsing chamber R. A supply conduit 70 and a return conduit 72 communicate the reservoir 68 with the rinsing chamber R. A pump 74 is provided on the supply conduit 70 for recirculating the rinsing liquid through the rinsing chamber R and the reservoir 68.

The following description is directed to how the chips and other solids, mostly created by the machining of the submerged work, are recovered from the machining liquid L in the machining chamber M. Employed to this end is the noted chip recovery vessel 60. This vessel communicates directly with the machining chamber M by way of a conduit 76 having an on-off valve 78. Further, as has been stated, the chip recovery vessel 60 communicates with the noted conduit 58 leading to the reversible pump 62. Thus another hydraulic circuit is created for the recirculation of the machining liquid L through the chip recovery vessel 60 and the hollow 53 in the drive spindle 18. The conduit 58 has an on-off valve 80, a filter 82 and a check valve 84, arranged in that order from the vessel 60 toward the pump 62.

In the operation of the chip recovery system constructed as in the foregoing, the pump 62 may be driven forwardly while the work W is being held by the chuck 14 for machining. Since the work W closes the hollow 53 in the drive spindle 18, the machining liquid L will not flow from the machining chamber M into the drive spindle hollow despite the operation of the pump 62. Instead, the check valve 84 on the conduit 58 will open to permit liquid flow from the chip recovery vessel 60 into the conduit 58. This liquid flow will induce in turn the flow of the liquid L from the machining chamber M into the chip recovery vessel 60 by way of the conduit 76. The metal chips and particles contained in the liquid L will deposit on the bottom of the vessel 60.

Further, as the pump 62 is driven forwardly as aforesaid, the liquid will flow from the chip recovery vessel 60 into the conduit 58. The solids that may still be contained in the liquid thus flowing out of the chip recovery vessel 60 will be removed by the filter 82 on the conduit 58. Then the cleaned liquid will flow through the check valve 84 and the pump 62 and back into the machining chamber M by way of the conduit 56, bypassing the drive spindle hollow 53 which is now closed by the work W on the chuck 14.

Thus, in this embodiment of the invention, the single reversible pump 62 serves more purposes than one; namely, the loading and unloading of the work W on and from the chuck 14, and the recirculation of the machining liquid L through the chip recovery vessel 60 for the recovery of the metal chips and other solids.

The on-off valves 78 and 80 on the conduits 76 and 58 are intended to expedite the withdrawal of the recovered chips from within the recovery vessel 60. For such withdrawal the valves 78 and 80 may be closed, and the recovery vessel 60 may be disengaged from the conduits 58 and 76.

As an additional feature of the invention, temperature control means are provided at 86 in FIG. 1. The temperature control means 86 is intended to control the temperature of the liquid L in the machining chamber M to suit the material of the work W being machined. The temperature control means 86 will serve the additional purpose of controlling the temperature of the complete machine tool 10 through the temperature control of the liquid L.

Although the submerged work machine tool according to the invention has been shown and described hereinbefore in highly specific aspects thereof, it is not desired that the present invention be limited by the exact details of such disclosure. A variety of modifications, alterations and adaptations of the illustrated embodiment will suggest themselves to one skilled in the art in order to conform to design preferences or to the requirements of each specific application of the invention, without departing from the proper scope or fair meaning of the subjoined claims.

What is claimed is:

1. A machine tool for machining work with a cutting tool in a submerged state, comprising:
   (a) a liquid tight enclosure for containing a machining liquid, the enclosure defining a machining chamber in which work is to be machined;
   (b) tool holding means for holding a desired cutting tool in the machining chamber;
   (c) work holding means for holding work in the machining chamber;
   (d) means for hydrodynamically loading work on the work holding means by utilizing the machining liquid contained in the machining chamber;
   (e) means for creating relative cutting action between the cutting tool being held by the tool holding means and the work being held by the work holding means in the machining chamber, so that the work is machined into a desired product while being submerged in the machining liquid; and
   (f) means for hydrodynamically unloading the completed product from the work holding means by utilizing the machining liquid contained in the machining chamber.

2. The machine tool of claim 1 further comprising chip recovery means for recovering from the machining liquid the chips and other solids that are created by machining.

3. The machine tool of claim 1 further comprising:
   (a) a second liquid tight enclosure disposed adjacent the first recited enclosure, the second enclosure defining a rinsing chamber;
   (b) hatch means disposed between the machining chamber and the rinsing chamber for the transfer of the completed product from the former to the latter; and (c) a hydraulic circuit for recirculating a rinsing liquid through the rinsing chamber and hence for rinsing the product.

4. The machine tool of claim 1 further comprising temperature control means for controlling the temperature of the machining liquid contained in the machining chamber.

5. A machine tool for machining work with a cutting tool in a submerged state, comprising:
   (a) a liquid tight enclosure for containing a machining liquid, the enclosure defining a machining chamber in which work is to be machined;
   (b) tool holding means for holding a desired cutting tool in the machining chamber;
   (c) work holding means for holding work in the machining chamber;
   (d) means for creating relative cutting action between the cutting tool being held by the tool holding means and the work being held by the work holding means in the machining chamber, so that the work is machined into a desired product while being submerged in the machining liquid; and
   (e) a hydraulic circuit utilizing the machining liquid contained in the machining chamber for hydrodynamically loading the work on the work holding means and unloading the completed product from the work holding means.

6. The machine tool of claim 5 further comprising a second hydraulic circuit for withdrawing the machining liquid from the machining chamber for the recovery from the machining liquid of the chips and other solids that are created by machining, and for subsequently returning the machining liquid to the machining chamber.

7. The machine tool of claim 5 further comprising:
   (a) a second liquid tight enclosure disposed adjacent the first recited enclosure, the second enclosure defining a rinsing chamber;
   (b) hatch means disposed between the machining chamber and the rinsing chamber for the transfer of the completed product from the former to the latter after having been unloaded from the work holding means; and
   (c) a second hydraulic circuit for recirculating a rinsing liquid through the rinsing chamber and hence for rinsing the product contained therein.

8. The machine tool of claim 5 further comprising temperature control means for controlling the temperature of the liquid contained in the machining chamber.

9. A machine tool for machining work with a cutting tool in a submerged state, comprising:
   (a) a liquid tight enclosure for containing a machining liquid, the enclosure defining a machining chamber in which work is to be machined;
   (b) tool holding means for holding a desired cutting tool in the machining chamber;
   (c) a drive spindle having a hollow extending therethrough and communicating with the machining chamber;
   (d) a work holder mounted to one end of the drive spindle and disposed in the machining chamber for holding work therein;
   (e) drive means for imparting rotation to the drive spindle and hence to the work being held by the work holder on the drive spindle;
   (f) feed means for feeding the cutting tool on the tool holding means against the revolving work, so that the work is machined into a desired product while being submerged in the machining liquid; and
   (g) pump means for drawing the machining liquid from the machining chamber into the hollow in the drive spindle in order to load the work on the work holder on the drive spindle, and for forcing the machining liquid into the machining chamber through the hollow in the drive spindle in order to unload the completed product from the work holder.

10. The machine tool of claim 9 further comprising a work chute having an entrance end disposed outside the machining chamber and an exit end disposed adjacent the work holder, the work being introduced into the machining chamber through the work chute before being loaded on the work holder by the action of the pump means.

11. The machine tool of claim 10 wherein the completed product is returned to the exit end of the work chute on being unloaded from the work holder, and wherein the machine tool further comprises:
    (a) a second liquid tight enclosure defining a rinsing chamber and disposed under the first recited enclosure, the exit end of the work chute being held against the second enclosure;
    (b) hatch means between the exit end of the work chute and the rinsing chamber for the transfer of the completed product from the former to the latter; and
    (c) second pump means for recirculating a rinsing liquid through the rinsing chamber and hence for rinsing the product contained therein.

12. The machine tool of claim 9 further comprising a chip recovery vessel in communication with the machining chamber for withdrawing the machining liquid from the machining chamber in order to recover from the machining liquid the chips and other solids that are created by machining.

13. The machine tool of claim 9 wherein the drive spindle is rotatably mounted within a headstock, and wherein the machine tool further comprises an impeller mounted on the drive spindle for joint rotation therewith, the impeller being effective to draw atmospheric air into the head stock both for preventing the leakage of the machining liquid from the machining chamber and for cooling the drive spindle.

14. The machine tool of claim 9 further comprising a headstock, and a hydrostatic bearing for rotatably supporting the drive spindle on the headstock.

15. A machine tool for machining work with a cutting tool in a submerged state, comprising:
    (a) a liquid tight enclosure for containing a machining liquid, the enclosure defining a machining chamber in which work is to be machined;
    (b) tool holding means for holding a desired cutting tool in the machining chamber;
    (c) a drive spindle having a hollow extending therethrough and communicating with the machining chamber;
    (d) a work holder mounted to one end of the drive spindle and disposed in the machining chamber for holding work therein;
    (e) drive means for imparting rotation to the drive spindle and hence to the work being held by the work holder on the drive spindle;
    (f) feed means for feeding the cutting tool on the tool holding means against the revolving work, so that the work is machined into a desired product while being submerged in the machining liquid; and (g) a first hydraulic circuit for recirculating the machining liquid out of and back into the machining chamber through the hollow in the drive spindle;

(h) a reversible pump included in the first hydraulic circuit for drawing the machining liquid from the machining chamber into the hollow in the drive spindle in order to load the work on the work holder on the drive spindle, and for forcing the machining liquid into the machining chamber through the hollow in the drive spindle in order to unload the completed product from the work holder, the hollow in the drive spindle being discommunicated from the machining chamber when the work is held by the work holder; and (i) a second hydraulic circuit including a chip recovery vessel for recovering from the machining liquid the chips and other solids that are created by machining, the chip recovery vessel being in communication with the machining chamber and with the first hydraulic circuit, the reversible pump being effective, when the hollow in the drive spindle is discommunicated from the machining chamber by the work on the work holder, to cause the flow of the machining liquid from the machining chamber into the chip recovery vessel and thence back into the machining chamber via the first hydraulic circuit.

16. The machine tool of claim 15 wherein the chip recovery vessel is removable from the rest of the machine tool, and wherein the machine tool further comprises valve means for discommunicating the chip recovery vessel from the machining chamber and from the first hydraulic circuit.

17. The machine tool of claim 15 wherein the second hydraulic circuit further comprises a filter disposed between the chip recovery vessel and the machining chamber for filtering the machining liquid before being returned to the machining chamber.

* * * * *